US006245231B1

(12) United States Patent
Maki et al.

(10) Patent No.: US 6,245,231 B1
(45) Date of Patent: Jun. 12, 2001

(54) FUEL FILTER APPARATUS WITH ANTI-ELECTROSTATIC FUNCTION

(75) Inventors: Naoki Maki; Kenji Okabe, both of Kariya; Hideyuki Nakai, Obu; Kunihiro Umetsu, Anjo; Akiyoshi Mukaidani, Takahama, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/353,279

(22) Filed: Jul. 14, 1999

(30) Foreign Application Priority Data

Aug. 18, 1998 (JP) .................................. 10-232471
May 10, 1999 (JP) .................................. 11-128637

(51) Int. Cl.$^7$ .................................. B01D 35/14
(52) U.S. Cl. .............................................. 210/243
(58) Field of Search ............................. 210/243

(56) References Cited

U.S. PATENT DOCUMENTS

| | | | |
|---|---|---|---|
| 2,534,907 | * | 12/1950 | Ham . |
| 3,478,494 | * | 11/1969 | Lustenader . |
| 4,187,179 | * | 2/1980 | Harms . |
| 5,164,084 | | 11/1992 | Danowski et al. . |
| 5,185,086 | * | 2/1993 | Kaali et al. . |
| 5,352,347 | * | 10/1994 | Reichert . |
| 5,380,432 | | 1/1995 | Brandt . |
| 6,099,726 | * | 8/2000 | Gembolis . |
| B1 6,168,713 | * | 1/2001 | Sekine . |

FOREIGN PATENT DOCUMENTS

| 61-8102 | 1/1986 | (JP) . |
|---|---|---|
| 1-27856 | 8/1989 | (JP) . |
| WO96/23569 | 8/1996 | (JP) . |

OTHER PUBLICATIONS

CRC Handbook of Chemistry & Physics, 59th ed., p. E–84.*

* cited by examiner

Primary Examiner—Chester T. Barry
(74) Attorney, Agent, or Firm—Pillsbury Winthrop LLP

(57) ABSTRACT

The filter apparatus is composed of a filter housing made of non-conductive material, a filter element made of conductive material contained in the filter housing, and a conductive plug with a sealing element. The filter housing has a bore and the conductive plug is inserted into the bore of the filter housing so that the clearance between the conductive plug and the filter housing is hermetically sealed by the sealing element. The conductive plug is connected in circuit to the filter element in a manner that a part of the plug is exposed out of the filter housing and an earth wire attached to the exposed portion of the plug. The static electricity generated in the filter apparatus is released via a conductive path extending from the filter element through the plug to the earth wire so that the electrostatic discharge may be prevented. The conductive plug is made of material having $10^7$ to $10^{11}$ Ω·cm resistivity. Such a value of resistivity serves to assure not only an adequate conductivity for releasing the static electricity but also an adequate resistance for preventing the electrostatic discharge from the conductive plug, if the earth wire becomes off or its connection is forgotten.

11 Claims, 8 Drawing Sheets

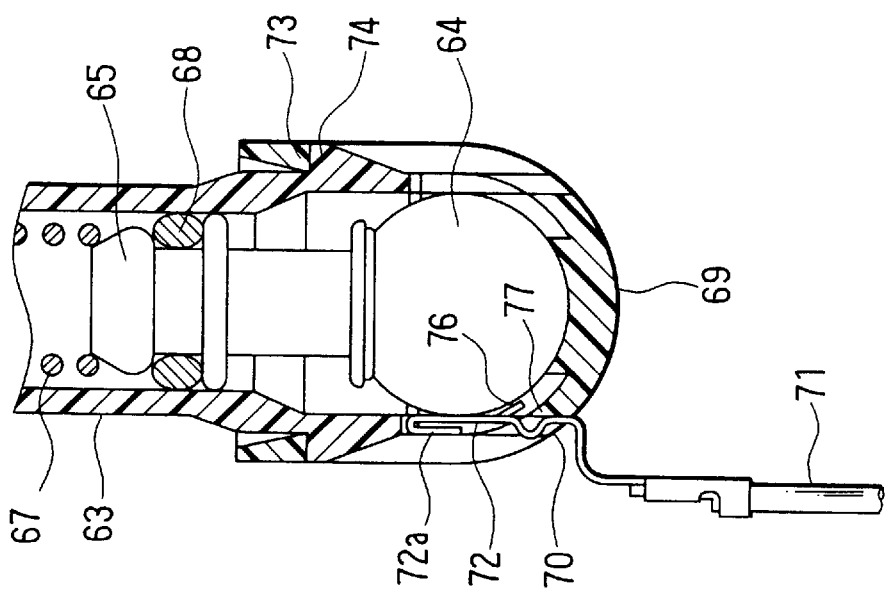
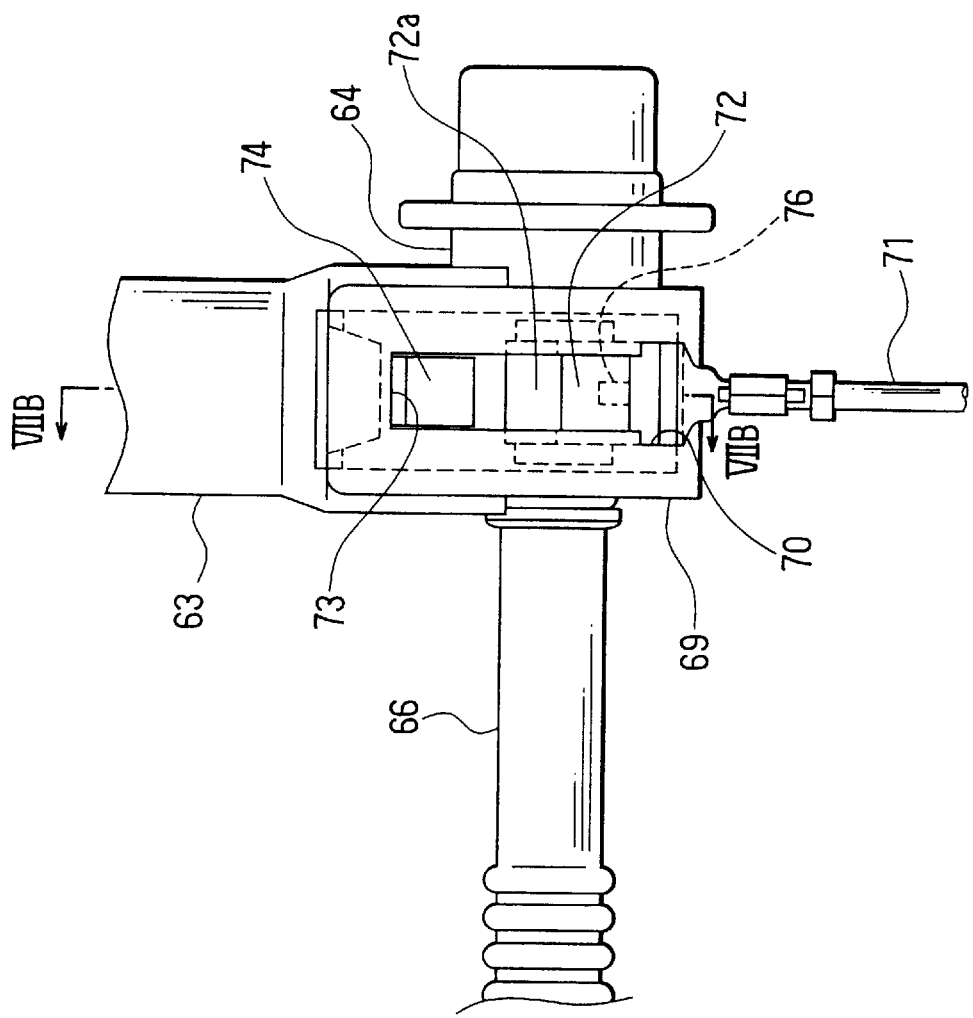

FUEL FILTER APPARATUS WITH ANTI-ELECTROSTATIC FUNCTION

CROSS REFERENCE TO RELATED APPLICATION

This application is based upon and claims the benefit of priority of Japanese Patent Applications No. H.10-232471 filed on Aug. 19, 1998 and Japanese Patent Applications No. H.11-128637, the contents of which are incorporated herein by reference.

BACKGROUND OF THE INVENTION

1. Field of the Invention

The present invention relates to a fuel filter apparatus having a means for releasing static electricity to outside, that is, the fuel filter apparatus with an anti-electrostatic function.

2. Description of Related Art

A fuel system for vehicles is provided with a fuel filter apparatus for filtering the fuel to be supplied from a fuel pump to fuel injectors. The fuel filter apparatus has generally a filter housing made of design in which a filter element is contained. When the fuel passes through the filter element, static electricity is likely to be generated and taken on the resin filter housing. Therefore, if the static electricity discharges from the filter housing to adjacent metal components, the filter housing may be cracked due to a discharge impact of the static electricity.

To cope with this problem, it has been proposed to prevent the electrostatic discharge in a manner that an earth wire is connected to the outside of the filter housing made of conductive resin to release the static electricity.

However, conductive design is more expensive, compared with non-conductive design. Further, if the earth wire comes off the filter housing due to some reasons or its connection to the filter housing is forgotten, the static electricity is likely to be discharged from the filter housing because the entire filter housing is made of conductive resin. Therefore, a problem that the filter housing may be cracked still exists.

SUMMARY OF THE INVENTION

The present invention has been made in view of the above mentioned problem, and an object of the present invention is to provide a filter apparatus in which the electrostatic discharge can be effectively prevented.

To achieve the above object, the filter apparatus is composed of a filter housing made of non-conductive material, a filter element made of conductive material contained in the filter housing, and a conductive plug with a sealing element. The filter housing has a bore and the conductive plug is inserted into the bore of the filter housing so that the clearance between the conductive plug and the filter housing is hermetically sealed by the sealing element. The conductive plug is connected in circuit to the filter element in a manner that a part of the plug is exposed out of the filter housing and an earth wire attached to the exposed portion of the plug to be connected in circuit to the plug.

According to the above construction, the static electricity generated in the filter apparatus is released via a conductive path extending from the filter element through the plug to the earth wire so that the electrostatic discharge may be prevented. Even if the earth wire comes off the plug or the earth wire's connection to the plug is forgotten, the electrostatic discharge from the filter housing is unlikely to take place owing to the non-conductive material of the filter housing.

Further, as the earth wire is connected in circuit to the filter element via the conductive plug, a troublesome work of drawing the earth wire into the inside of the filter housing for connecting the same to the filter element can be eliminated. As a result, the connection work of the earth wire becomes simpler.

It is preferable to employ the conductive plug made of material having $10^7$ to $10^{11}$ Ω·cm resistivity. Such a value of resistivity serves to assure not only an adequate conductivity for releasing the static electricity but also an adequate resistance for preventing the electrostatic discharge from the conductive plug, even if the earth wire comes off or its connection is forgotten.

To connect the plug in circuit to the filter element, it is preferable to employ an elastic member installed between the plug and the filter element for pressing against the plug and the filter element or to employ the plug having a sharp inserting portion at its leading end to be pierced into the filter element.

A pressure regulator for adjusting fuel pressure may be also used as the conductive plug, too, if the outer body of the pressure regulator is made of conductive material. A fuel inlet pipe of the pressure regulator is inserted into the filter housing and connected in circuit to the filter element through the elastic member such as a conductive coil spring.

In general, the filter housing is detachably assembled with a supporting member. When it is necessary to replace the filter element, the filter housing is detached from the supporting member. It is preferable to have a conductive connector for the earth wire placed between the filter housing and the supporting member in a manner that the conductive plug is easily connected in circuit with the connector for the earth wire, when the filter housing is assembled with the supporting member.

Preferably, the connector is made of an elastic material and presses against the plug by its own elastic force. This construction makes the connection and the disconnection in circuit between the plug and the earth wire very easy, when the filter housing is attached to and detached from the supporting member, respectively. Further, if the connector is always fixed on the supporting member, the connecting or disconnecting work of the earth wire is not necessary, whenever the filter element is replaced.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIG. 7A is a front view illustrating an assembly construction of a pressure regulator;

FIG. 7B is a cross sectional view taken along a line VIIB—VIIB in FIG. 7A; and

DETAILED DESCRIPTION OF THE PREFERRED EMBODIMENTS

Figure 2A:
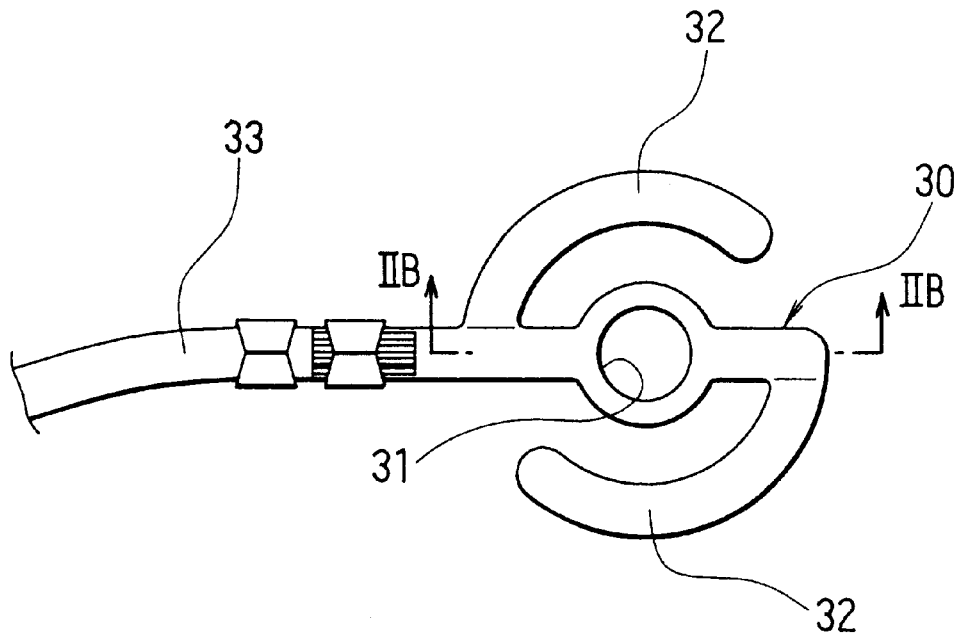
FIG. 2A is a plan view of a spring terminal.
Figure 2B:
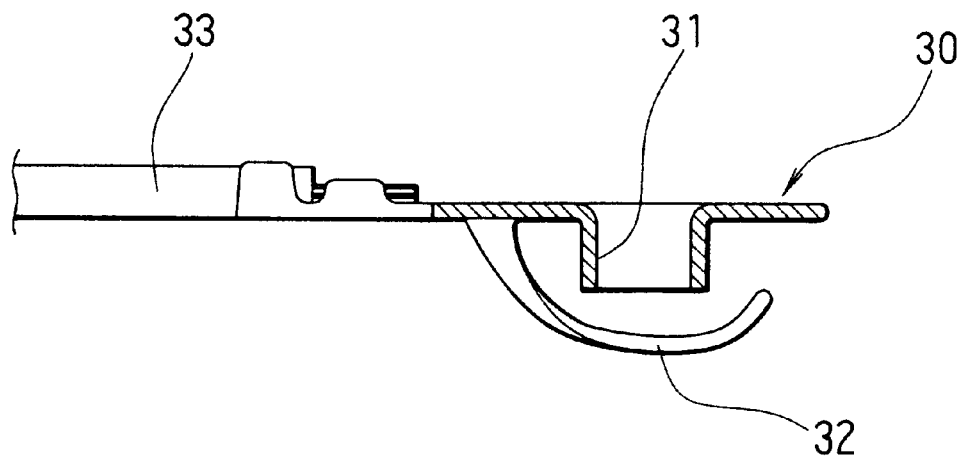
FIG. 2B is a cross sectional view taken along a line IIB—IIB in FIG. 2A.
Figure 3:
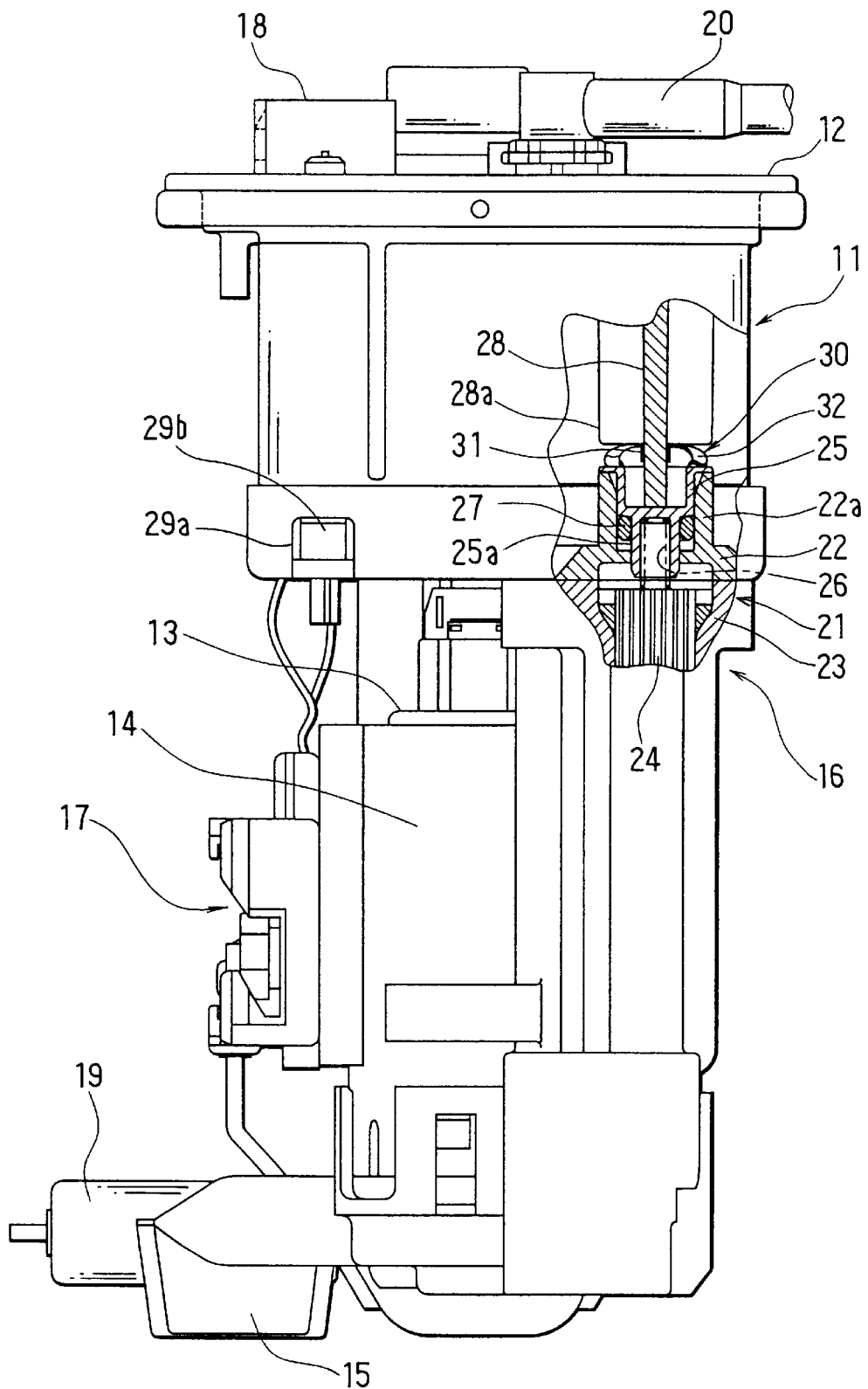
FIG. 3 is a front view, in part in cross section, illustrating various fuel system parts and components assembled to a holding bracket.

A first embodiment of the present invention is described hereinafter according to FIGS. 1 to 3. FIG. 3 shows an assembly of various parts and components for fuel systems installed inside a fuel tank. A holding bracket 11 (supporting member) made of resin is provided with a flange 12 on an upper portion thereof. The various parts and components for fuel systems are assembled to the holding bracket 11 and held in the fuel tank in a manner that the flange 12 covers as a lid over an opening (not shown) of the fuel tank. A fuel pump 13 is contained in a container case 14 assembled at the lower side of the holding bracket 11. The fuel pump 13 is provided with a discharge port facing upward, an intake port being placed on a lower side and a strainer 15 disposed in the intake port for eliminating foreign material in fuel.

A fuel filter apparatus 16 for filtering the fuel to be discharged from the fuel pump 13, a potentiometer type fuel gauge 17 and an electric connector 18 are assembled to the holding bracket 11, respectively. The fuel gauge 17 has a float 19 movable up and down according to the height level change of fuel in the fuel tank and the up and down moving quantity of the float 19 is measured by a potentiometer to detect the fuel amount in the fuel tank. The fuel gauge 17 and the fuel pump 13 are connected in circuit to an electronic control unit (not shown) for vehicles.

The outlet of the fuel filter apparatus 16 is communicated to a fuel discharge pipe 20 installed on the holding bracket 11. The fuel discharged from the fuel pump 13 and filtered by the fuel filter apparatus is delivered from the fuel discharge pipe 20 to fuel injectors (not shown).

Figure 1:
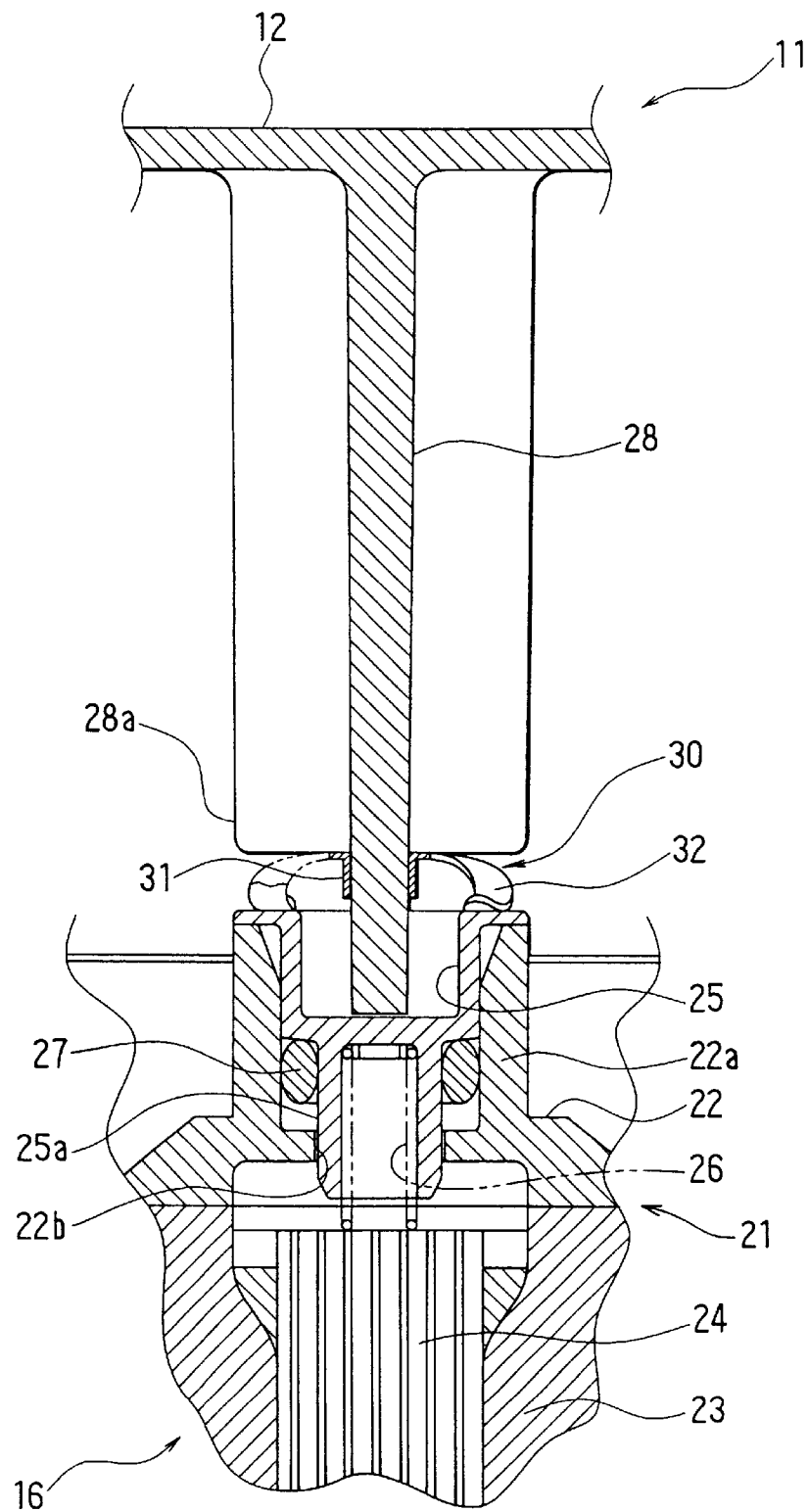
FIG. 1 is a partly enlarged cross sectional front view of a fuel filter apparatus according to a first embodiment of the present invention.

The detail construction of the fuel filter apparatus 16 according to the present invention is shown in FIG. 1. A filter housing 21 constituting an outer case of the fuel filter apparatus 16 is comprised of an upper housing 22 and a lower housing 23. The upper housing 22 and the lower housing 23 are made of non-conductive resin and integrated into a unit, for example, by welding. A fuel filter element 24 is contained in the filter housing 21 and is formed by electrical conductive member such as a conductive filtration paper mixed, for example, with carbon fiber.

A conductive plug 25 is inserted from an upper side into a bore of a cylindrical portion 22a formed upward on the upper housing 22. A lower part of a smaller diameter cylindrical portion 25a integrally formed downward on the plug 25 is inserted into an opening 22b of the upper housing 22. The conductive plug 25 is made of resin having a value of resistivity of, for example, $10^7$ to $10^{11}$ Ω·cm due to reasons mentioned later in detail.

A conductive coil spring 26 (elastic member) is installed inside the smaller diameter cylindrical portion 25a and presses by its own elastic force against the filter element 24 and the plug 25 so that the filter element 24 and the plug 25 are connected in circuit. A rubber O ring 27 (sealing member) is placed on the outer circumference of the smaller diameter cylindrical portion 25a to hermetically seal a clearance between the outer circumference surface of the cylindrical portion 25a and the inner circumference surface of the bore of the cylindrical portion 22a.

The flange 12 is integrally provided with a holder 28 extending downward. The lowered leading end (stopper) of the holder 28 abuts on or is adjacent to the conductive plug 25 so that the plug 25 is prevented from coming out upward. A spring terminal 30 (earth terminal) for connecting the earth wire 33 in circuit with the plug 25, as shown in FIGS. 2A and 2B, is placed at the lower side of the holder 28. The spring terminal 30 is provided with a cylindrical fitting portion 31 at its center and a pair of spring elements 32 curving downward on both sides of the cylindrical fitting portion 31. The base portion of the spring terminal 30 is linked, for example, by solderless connection with the leading end of the earth wire 33. The earth wire 33, like an earth wire (not shown) of the fuel pump 13, is connected in circuit to a vehicle body through the electric connector 18. The cylindrical fitting portion 31 is press fitted to the lower portion of the holder 28 to abut on the leading end of a lib 28a of the holder 28 so that the spring terminal 30 is fixed to the holder 28.

When the filter housing 21 is attached to the holding bracket 11 from a lower side, the spring elements 32 is pushed up, keeping in contact with the upper end of the plug 25 so that the spring element 32 is pressed against the upper end of the plug 25. Thus, the spring terminal 30 is connected in circuit with the conductive plug 25 to form a conductive path from the filter element 24 through the coil spring 26, the conductive plug 25 and the spring terminal 30 to the earth wire 33.

Since it is necessary that the filter element 24 is periodically replaced, the fuel filter apparatus 16 is detachably fitted with the holding bracket 11 in a manner, for example, that notched portions 29a formed on the filter housing 21 are engaged or snap fitted with clawed portions 29b formed on the holding bracket 11.

When it is required to detach the fuel filter apparatus 16 from the holding bracket 11, the filter housing 21 is drown down after releasing the engagement of the filter housing 21 with the holding bracket 11. The spring terminal 30 remains on the holding bracket 11 at this time, since the spring terminal 30 is fixed with the holder 28, and the filter housing 21 and all parts and components installed below the conductive plug 25 are detached from the holding bracket 11. Therefore, the plug 25 becomes off the spring terminal 30 and the filter 24 is disconnected in circuit with the earth wire 33 simultaneously when the fuel filter apparatus 16 is detached.

On the other hand, if it is required to attach the fuel filter apparatus 16 to the holding bracket 11, the filter housing 21 is pressed from the lower side against the holding bracket 11 to engage with the same. The plug 25 is also pressed against the spring terminal 30 and the filter 24 is connected in circuit with the earth wire 33 simultaneously when the fuel filter apparatus 16 is attached. To fix the filter housing 21 with the holding bracket 11, a screw fastening may be employed instead of the snap fit engagement.

According to the embodiment mentioned above, the static electricity generated inside the fuel filter apparatus 16 is released through the conductive path comprised of the filter element 24, the coil spring 26, the plug 25, the spring terminal 30 and the earth wire 33 so that the electrostatic discharge may be prevented. Further, in case that the earth wire is not connected by some reasons, for example, when the earth wire becomes off or its connection is forgotten, the electrostatic discharge from the filter housing 21 scarcely takes place and the filter housing may be prevented from being cracked, because the filter housing is made of non-conductive resin.

If the value of the resistance of the plug 25 is too low, the electrostatic discharge from the plug 25 is likely to take place when the earth wire 33 is disconnected to the plug 25. As the value of the resistance of the plug 25 is higher, the electrostatic discharge is more effectively prevented, but the conductivity for releasing the static electricity becomes worse when the earth wire 33 is correctly connected. According to an experimental result, if the resistivity of the plug 25 is higher than $10^{11}$ Ω·cm, the static electricity may not be adequately released when the earth wire 33 is correctly connected. On the other hand, if the resistivity of the plug 25 is lower than $10^7$ Ω·cm, the electrostatic discharge from the plug 25 is likely to take place when the earth wire is disconnected.

In consideration of the above result, the value of the resistivity of the conductive plug 25 according to the embodiment of the present invention is determined within the range of $10^7$ to $10^{11}$ Ω·cm. Therefore, not only an adequate conductivity for releasing the static electricity but also an adequate resistance for preventing the electrostatic discharge can be secured. That is, when the earth wire 33 is correctly connected, the static electricity of the fuel filter apparatus 16 is certainly released to outside through the conductive plug 25 so that the electrostatic discharge may be prevented. On the other hand, when the earth wire 33 is disconnected by some reasons, the electrostatic discharge can be prevented due to the resistance value of the plug 25.

According to the first embodiment, the conductive plug 25 is inserted from the outside of the filter housing to be in contact with the filter element 24 and the filter element 24 is connected in circuit with the earth wire 33 attached to the plug 25. Therefore, a troublesome work of drawing the earth wire 33 into the inside of the filter housing 21 for connecting the same to the filter element 24 can be eliminated. As a result, the connection work of the earth wire 33 becomes simpler.

Further, the plug 25 is connected to the filter element 24 in use of the elastic force of the coil spring 26 put between the plug 25 and the filter element 24. The earth wire 33 is connected with the plug 25 in use of the elastic force of the spring terminal 30 fixed with the earth wire. Therefore, for these connections, it is not necessary to employ troublesome works such as welding or caulking and reliable connections in circuit can be accomplished by a simple assembly work.

Furthermore, the spring terminal 30 is fixed to the holder 28 of the holding bracket 11 and, when the fuel filter apparatus 16 is detached, the parts and components installed below the conductive plug 25 in addition to the filter housing 21 can be detached. Therefore, the plug 25 is connected to or disconnected from the spring terminal simultaneously when the fuel filter apparatus is attached to or detached from the holding bracket 11. Thus, it is not necessary to perform the connection or disconnection works of the earth wire 33 when the fuel filter apparatus is attached or detached. Not only the replacement work of the filter element becomes simpler, but also forgetting the earth wire connection can be effectively prevented.

Figure 4:
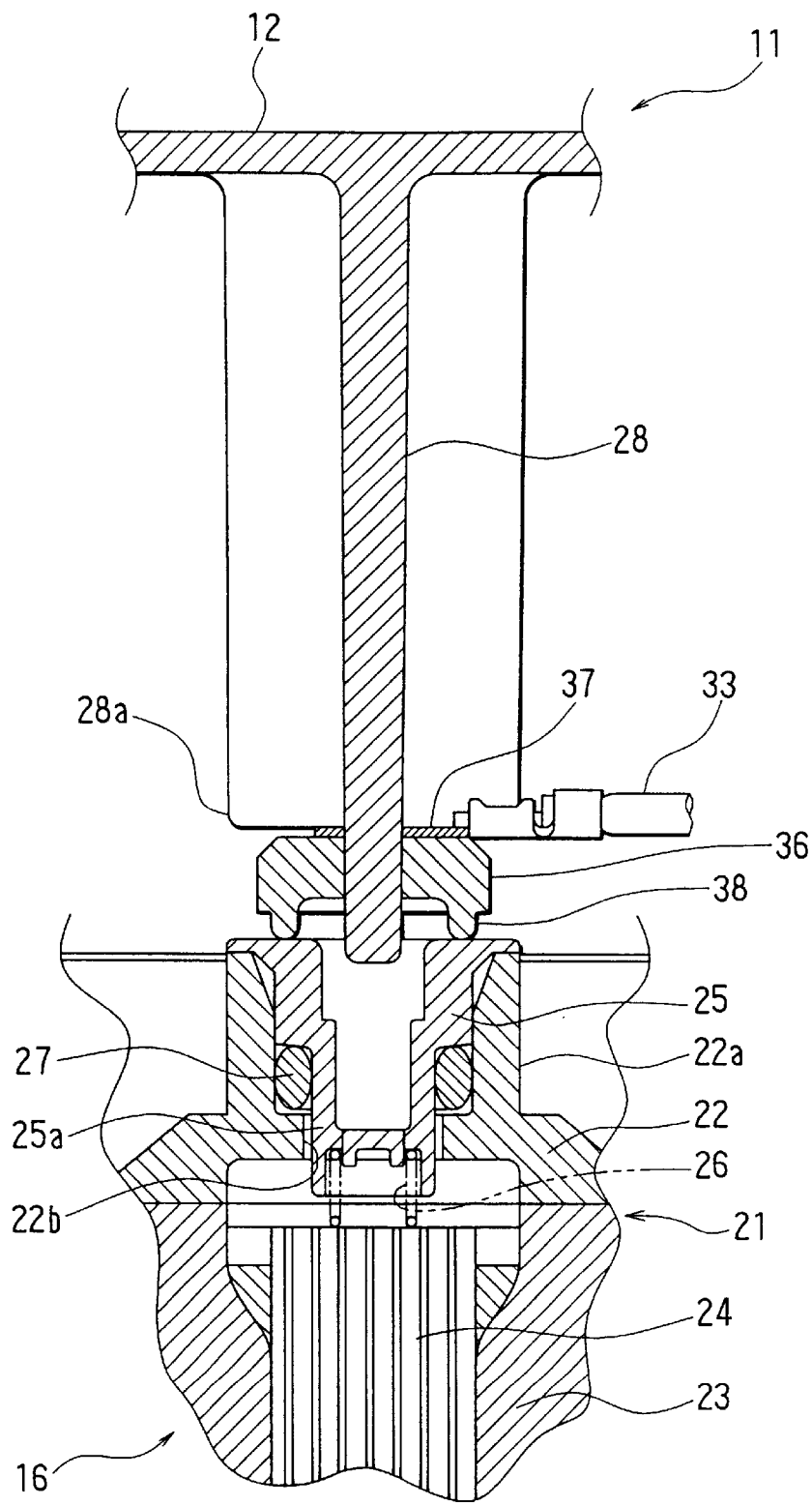
FIG. 4 is a partly enlarged cross sectional front view of a fuel filter apparatus according to a second embodiment of the present invention.

The second embodiment of the present invention is described according to FIG. 4. The same parts and components as those in the first embodiment have the same reference numbers and the explanation thereof is omitted.

Though the spring terminal 30 is used as the connector for connecting the earth wire 33 to the conductive plug 25 in case of the first embodiment, a ring shaped conductive rubber 36 is used as the earth terminal in case of the second embodiment. The ring shaped rubber 36 is fixed with the holder 28 by press fitting. An earth terminal 37 fitted to the leading end of the earth wire 33 is inserted between the ring shaped rubber 35 and the lower end of the lib 28a of the holder so that the ring shaped rubber 35 is connected in circuit with the earth terminal 37. A ring shaped projection 38 formed on the lower surface of the ring shaped rubber 36 is pressed against the upper end of the plug 25 so that the plug 25 is connected in circuit with the ring shaped rubber 36. The conductive path is comprised of the filter element 24, the coil spring 26, the plug 25, the ring shaped rubber 36, the earth terminal 37 and the earth wire 33. The fuel filter apparatus of the second embodiment has the same effect as that of the first embodiment.

Figure 5:
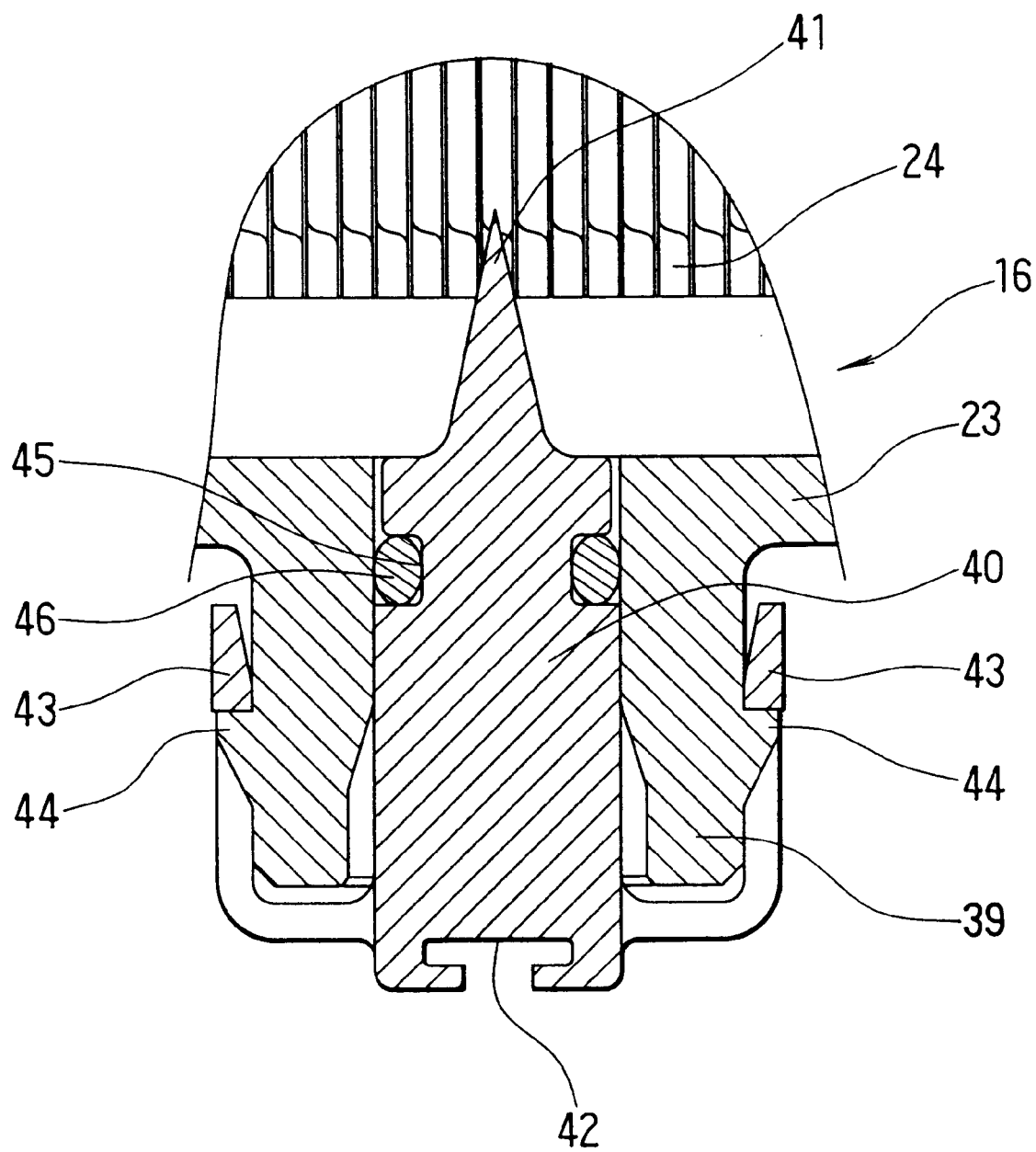
FIG. 5 is a partly enlarged cross sectional front view of a fuel filter apparatus according to a third embodiment of the present invention.

Next, a third embodiment of the present invention is described according to FIG. 5. The lower housing 23 is provided with a cylindrical opening portion 39 at a lower end thereof. A conductive plug 40 having $10^7$ to $10^{11}$ Ω·cm resistivity is installed into the cylindrical opening portion 39. The plug 40 is integrally provided with an insert 41 having a sharp end. The insert 41 is directly inserted into the filter element 24 so that the filter element 24 is connected in circuit with the plug 40. Further, the plug 40 is provided at the lower end thereof with a connecting hollow 42. An earth terminal (not shown) connected to the leading end of the earth wire is fixed with the connecting hollow 42 by clawed engagement or press fitting so that the plug 40 is connected in circuit with the earth wire. Thus, a conductive path is formed from the filter element 24 through the plug 40 to the earth wire.

A pair of letter L shaped elastic clawed portions 43 are integrally formed upward on both sides of the conductive plug 40. The plug 40 is assembled to the lower housing 23 in a manner that the elastic clawed portion 43 is elastically engaged with projections 44 provided on the outer circumference of the cylindrical opening portion 39 of the lower housing 23. A rubber O ring 46 is stored in a ring groove 45 formed on the outer surface of the plug 40. The O ring serves to seal a clearance between the outer circumference surface of the plug 40 and the inner circumference surface of the cylindrical opening portion 39. As mentioned above, the conductive plug 40 is connected in circuit with the filter element 24 by a simple assembly work.

In place of the insert 41 of the plug 40, the elastic member such as the spring for connecting in circuit the filter element 24 with the plug 40 as shown in the first and second embodiments may be used in the third embodiment, too. On the other hand, in the first and second embodiments, in place of the elastic member, the conductive plug 25 may be integrally provided at its leading end with a sharp insert to be inserted into the filter 24 so that the plug 25 is connected in circuit with the filter.

In the first to third embodiments, it is not essential that the resistivity of the conductive plug 25 or 40 is more than $10^7$ Ω·cm. Even if the conductive plug having less than $10^7$ Ω·cm resistivity is employed, the electrostatic discharge may be restrained so far, compared to the conventional fuel filter apparatus without the conductive plug.

Further, though the fuel filter apparatus 16 is attached to the holding bracket 11 according to the first to third embodiments, the fuel filter apparatus may be attached to any member other than the holding bracket 11.

In a system having no fuel return pipes through which excess fuel to be supplied to fuel injectors are returned to a fuel tank, a pressure regulator for adjusting fuel pressure is generally installed in the fuel filter apparatus. In general, the outer body of this pressure regulator is made of conductive metal. According to a fourth embodiment of the present invention, the pressure regulator installed in the fuel filter apparatus is commonly used as a conductive plug for releasing static electricity to outside.

Figure 6:
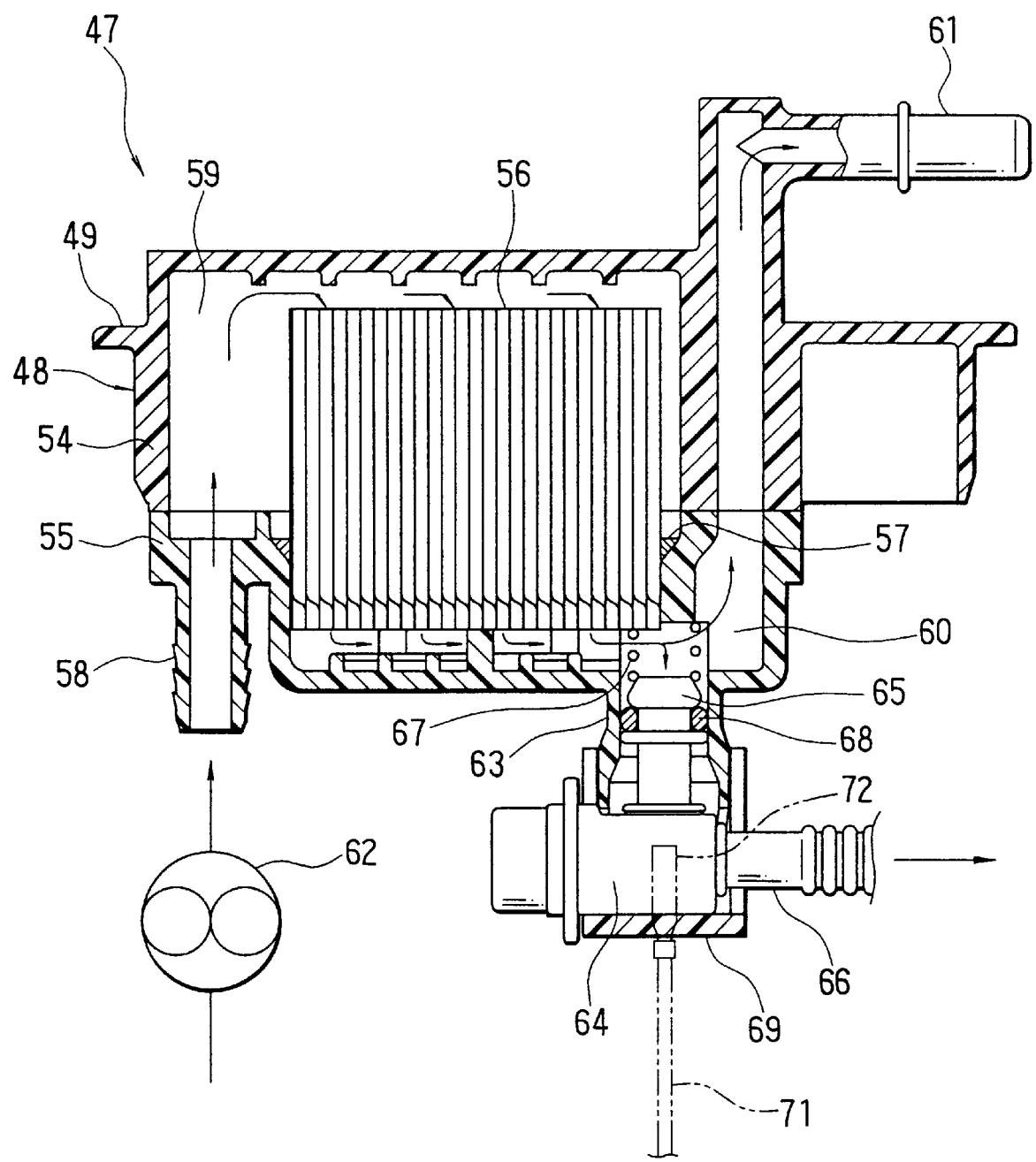
FIG. 6 is a cross sectional front view of a fuel filter apparatus according to a fourth embodiment of the present invention.
Figure 8:
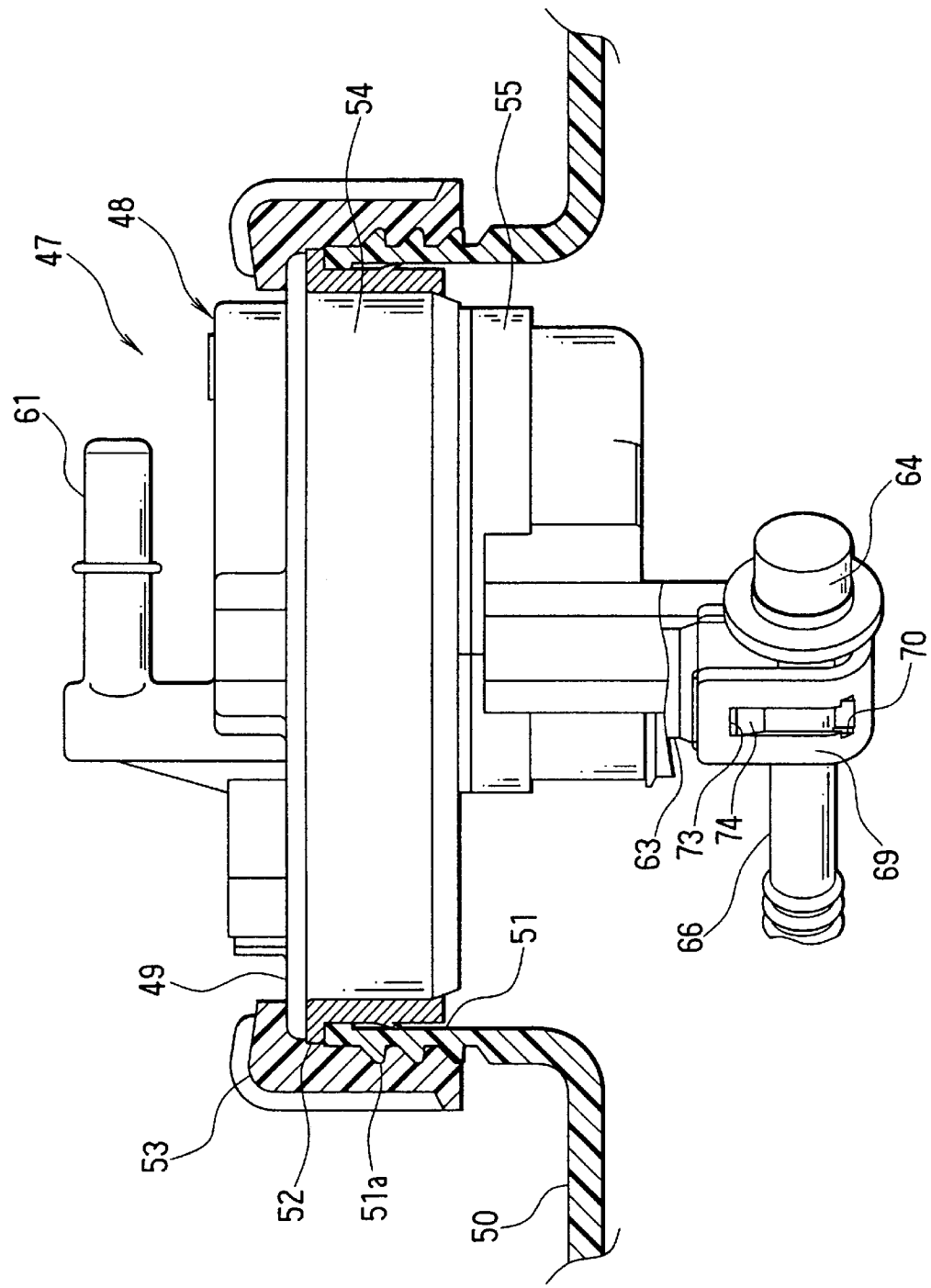
FIG. 8 is a view illustrating a fuel filter apparatus installed on a fuel tank.

FIGS. 6 to 8 show the construction of a fuel filter apparatus 47 according to the fourth embodiment. A filter housing 48 of the fuel filter apparatus 47 is inserted from an upper side into an opening portion 51 of a fuel tank 50 via a gasket 52, as shown in FIG. 8. A fastening ring 53 on the filter housing 48 is fastened with a screw portion 51a on the outer circumference of the opening portion 51. A flange 49 at the upper outer circumference of the filter housing 48 is put between the fastening ring 53 and the gasket 52 so that the fuel filter apparatus is fixed with the fuel tank 50.

As shown in FIG. 6, the filter housing 48 is provided with non-conductive resin upper and lower housings integrated into a unit by solerless connection. A conductive filter element 56 is contained in the filter housing 48. Between the outer circumference surface of the filter housing 56 and the inner circumference surface of the lower housing 55, filling material 57 such as heat-hardening epoxy resin is filled up to seal a clearance between the outer circumference surface of the filter housing 56 and the inner circumference surface of the lower housing 55 so that the filter 56 is fixed with the lower housing 55.

A fuel inlet pipe 58 is formed downward on the lower left side of the lower housing 55 and connected to a discharge port of a fuel pump 62 through a fuel pipe (not shown). An inflow passage 59 for leading the fuel flown from the inlet pipe 58 to an inlet (upper side) of the filter element 56 and an outflow passage 60 communicating to an outlet (lower side) of the filter element 56. An outlet pipe 61 communicating to the outflow passage 60 is formed on the upper side of the upper housing 54 and connected to fuel injectors (not shown) through a fuel pipe (not shown).

A cylindrical portion 63 is formed downward on the lower right side of the lower housing 55. A fuel inlet pipe 65 of the pressure regulator 64 is inserted into the inside of the cylindrical portion 63. The leading end of the fuel inlet pipe 65 faces the bottom of the filter element 56. The pressure regulator 64 plays a roll of returning excess fuel from the fuel inlet pipe 65 to the fuel tank 50 through a return pipe 66 so that the pressure of the fuel to be supplied to the fuel injectors may be kept constant. The outside body (including the fuel inlet pipe 65) of the pressure regulator 64 is made of conductive resin.

A coil spring 67 (elastic member) is inserted between the leading end of the fuel inlet pipe 65 and the bottom of the filter element 56. The coil spring 67 presses by its own elastic force against the filter element 56 and the fuel inlet pipe 65 so that the filter element 56 is connected in circuit to the fuel inlet pipe 65. A rubber O ring is installed on the outer circumference surface of the fuel inlet pipe 65 to seal a clearance between the outer circumference surface of the fuel inlet pipe 65 and the inner circumference surface of the cylindrical portion 63 of the lower housing 55.

The pressure regulator 64 is assembled in use of a letter U shaped bracket 69 as shown in FIGS. 7A, 7B and 8. The bracket 69 is provided on a lower side with a terminal bore 70 through which an earth terminal 72 connected to a leading end of an earth wire 71 is inserted into the bracket 69. The earth terminal is put between the bracket 69 and the pressure regulator 64. A clawed portion 73 at the upper end of the bracket 69 is elastically engaged or snap fitted with a notched portion 74 on the outer circumference of the cylindrical portion 63, as shown in FIG. 7B. As a result, The pressure regulator 64 is assembled in the cylindrical portion 63, while the bracket 69 plays a roll as a stopper for preventing the pressure regulator 64 from coming out from the filter housing 48, and the earth terminal 72 is connected in circuit with the pressure regulator 64.

As the leading end 72a of the earth terminal 72 is bent in letter U shape, the earth terminal 72 rigidly presses against the pressure regulator 64 by the elastic force of the leading end 72a. Further, the earth terminal 72 is provided with a clawed portion 76 inclined inward. The clawed portion 76 is engaged with an inner edge 77 of the terminal bore 70 of the bracket 69 so that the earth terminal may be prevented from coming out.

In the fuel filter apparatus 47 mentioned above, the static electricity generated in the fuel filter apparatus 47 is released through a conductive path comprised of the filter element 56, the coil spring 67, the pressure regulator 64, the earth terminal 72 and the earth wire 71. As the pressure regulator 64 plays a roll as a conductive plug, it is not necessary to employ separately not only a special purpose conductive plug but also an attachment for the plug and an O ring for sealing the attachment. Thus, the number of the parts and components are reduced so far that the construction of the fuel filter apparatus becomes simpler.

Further, according to the fourth embodiment, it is not necessary to carry out a troublesome connecting work such as soldering or caulking for the connection of the earth wire to the pressure regulator and a reliable connection in circuit thereof may be realized with a simple work that the earth terminal is elastically put between the bracket 69 and the pressure regulator 64.

In the first, second and forth embodiments, as a coil spring 26, 67 is inserted between the filter element 24, 56 and the conductive plug 25 (the pressure regulator 64 in the fourth embodiment) for connecting the filter in circuit with the plug, fuel flow is not restrained because the fuel flows through gaps of the coil spring 26, 67 and, even if the filter element 24, 56 is deformed due to the fuel flow or fuel pressure, the coil spring 26, 67 may be elastically followed in the deformation of the filter element 24, 56 so that the filter element and the coil spring may be always contacted in circuit.

However, the elastic member put between the filter element 24,56 and the plug 25 (or pressure regulator 64) is not limited to the coil spring 26,67, any conductive elastic members such as conductive rubbers and plate springs may be employed, unless the fuel flow is restrained thereby.

Furthermore, it goes without saying that the configuration of or the method for assembling the parts and components such as the filter housing 21,48, the conductive plug 25, 40, sealing element 27,68, the spring terminal 30, the ring shaped rubber 36, the earth terminal 72 and so on may be changed or modified within the scope not beyond the gist of the present invention.

What is claimed is:

1. A fuel filter apparatus to be installed in a fuel tank for filtering fuel to be supplied to internal combustion engines comprising:

a filter housing made of non-conductive material, the filter housing having a bore;

a filter element made of conductive material and contained in the filter housing;

a conductive plug inserted into the bore of the filter housing and connected in circuit to the filter element, a part of the conductive plug being exposed out of the filter housing to constitute an exposed portion;

a sealing element placed in the bore so as to contact an outer circumference of the plug and an inner circumference of the bore to hermetically seal a clearance between the bore of the filter housing and the conductive plug; and an earth wire connected in circuit to the exposed portion.

2. A fuel filter apparatus according to claim 1, wherein the conductive plug is made of material having $10^7$ to $10^{11}$ Ω·cm resistivity.

3. A fuel filter apparatus to be installed in a fuel tank for filtering fuel to be supplied to internal combustion engines comprising:

a filter housing made of non-conductive material, the filter housing having a bore;

a filter element made of conductive material and contained in the filter housing;

a conductive plug inserted into the bore of the filter housing and connected in circuit to the filter element, a part of the conductive plug being exposed out of the filter housing to constitute an exposed portion;

a sealing element for hermetically sealing a clearance between the bore of the filter housing and the conductive plug;

an earth wire connected in circuit to the exposed portion; and a stopper for preventing the conductive plug from coming out from the filter housing, wherein the earth wire is provided with an earth terminal inserted between the conductive plug and the stopper.

4. A fuel filter apparatus according to claim 3, wherein the stopper is a holding bracket for supporting the filter housing in the fuel tank and the earth terminal is fixed to the holding bracket so that the earth terminal remains at the holding bracket when the filter housing is detached from the holding bracket.

5. A fuel filter apparatus according to claim 4, wherein the earth terminal is an elastic member for pressing by its own elastic force against the conductive plug.

6. A fuel filter apparatus to be installed in a fuel tank for filtering fuel to be supplied to internal combustion engines comprising:

a filter housing made of non-conductive material, the filter housing having a bore;

a filter element made of conductive material and contained in the filter housing;

a conductive plug inserted into the bore of the filter housing and connected in circuit to the filter element, a part of the conductive plug being exposed out of the filter housing to constitute an exposed portion;

a sealing element for hermetically sealing a clearance between the bore of the filter housing and the conductive plug;

an earth wire connected in circuit to the exposed portion; and a conductive elastic member inserted between the conductive plug and the filter element for pressing by its own elastic force against the conductive plug and the filter element.

7. A fuel filter apparatus to be installed in a fuel tank for filtering fuel to be supplied to internal combustion engines comprising:

a filter housing made of non-conductive material, the filter housing having a bore;

a filter element made of conductive material and contained in the filter housing;

a conductive plug inserted into the bore of the filter housing and connected in circuit to the filter element, a part of the conductive plug being exposed out of the filter housing to constitute an exposed portion;

a sealing element for hermetically sealing a clearance between the bore of the filter housing and the conductive plug; and an earth wire connected in circuit to the exposed portion, wherein a leading end of the conductive plug is shaped sharp and pierced into the filter element.

8. A fuel filter apparatus, to be installed in a fuel tank for filtering fuel to be supplied to internal combustion engines comprising:

a filter housing made of non-conductive material, the filter housing, having a bore;

a filter element made of conductive material and contained in the filter housing;

a conductive plus inserted into the bore of the filter housing and connected in circuit to the filter element, a part of the conductive plus being exposed out of the filter housing to constitute an exposed portion;

a sealing element for hermetically sealing a clearance between the bore of the filter housing and the conductive plug; and an earth wire connected in circuit to the exposed portion, wherein the conductive plug is a pressure regulator for adjusting fuel pressure, an outer body of the pressure regulator being made of conductive material.

9. A fuel filter apparatus according to claim 8, further comprising:

a fuel inlet pipe of the pressure regulator to be inserted into the filter housing; and a conductive elastic member pressing by its own elastic force against the fuel inlet pipe and the filter element.

10. A fuel filter apparatus according to claim 9, wherein the conductive elastic member is a conductive coil spring.

11. A fuel filter apparatus according to claim 8, further comprising:

a bracket for supporting the pressure regulator not to come out from the filter housing, wherein an earth terminal of the earth wire is inserted between the outer body of the pressure regulator and the bracket.

* * * * *